UNITED STATES PATENT OFFICE.

GEORGE W. MARTIN, OF SAN ANTONIO, TEXAS.

CONDENSING APPARATUS.

1,299,982.  Specification of Letters Patent.  Patented Apr. 8, 1919.

Application filed July 12, 1918. Serial No. 244,596.

*To all whom it may concern:*

Be it known that I, GEORGE W. MARTIN, a citizen of the United States, residing at San Antonio, in the county of Bexar and State of Texas, have invented new and useful Improvements in Condensing Apparatus, of which the following is a specification.

My present invention pertains to apparatus for condensing lint, hair, and other substance susceptible of being reduced to bat form.

One of the objects of the invention is the provision of an apparatus possessed of large capacity and adapted to handle the product of a considerable number of linting machines, and this at a central point to obviate the objectionable dust so often encountered in lint rooms, and without passing the substance to be condensed through the fan; the dust and dirt being however taken from the substance and delivered through the fan into a dust collector.

Another object is the provision of a condensing apparatus in which the condensing of the lint or other substance is caused by the air as produced by an exhaust fan or fans.

To the attainment of the foregoing the invention consists in the condensing apparatus comprising the elements constructed and relatively arranged as hereinafter described and claimed.

Figure 1:
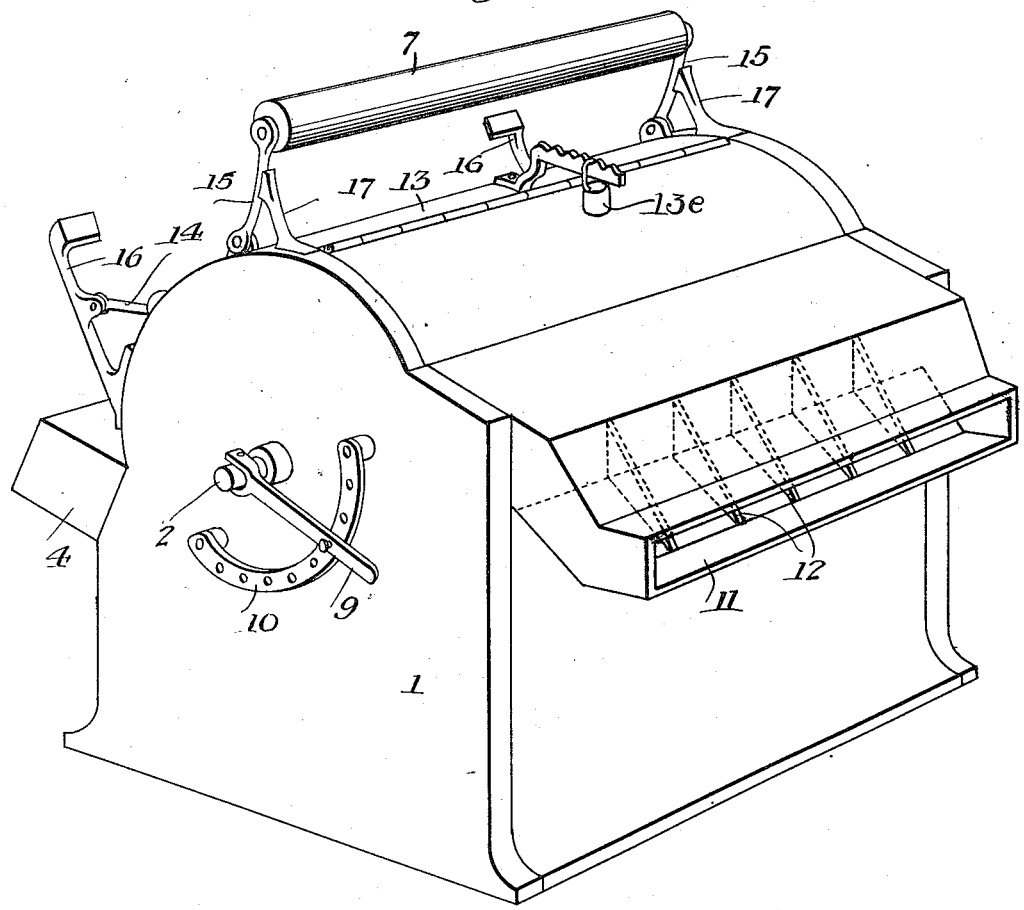
Figure 2:
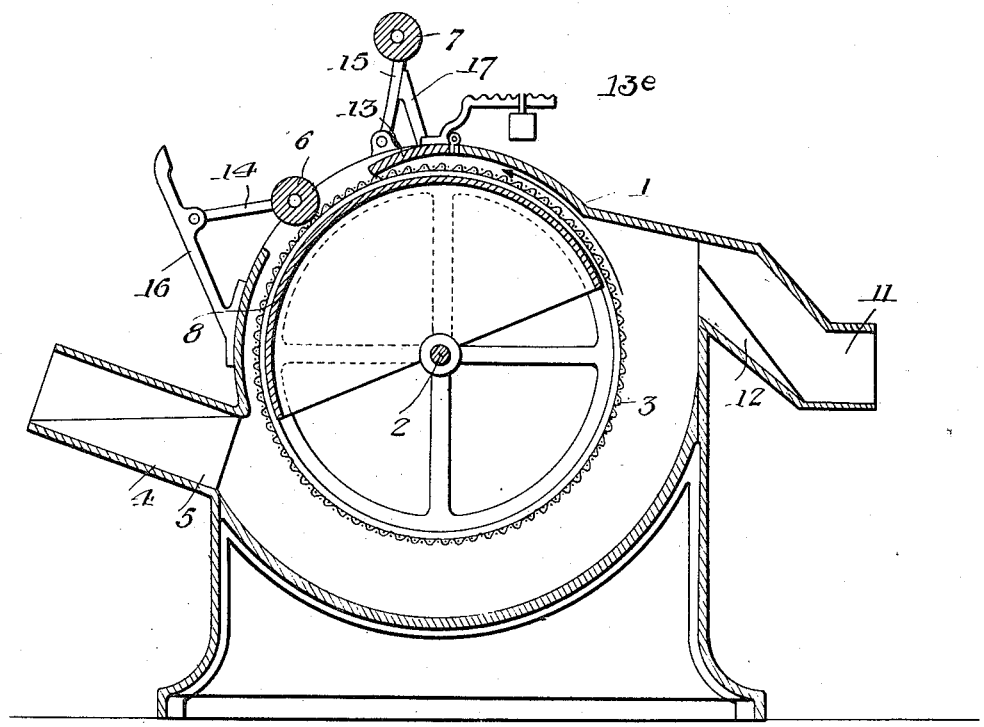
Figure 3:
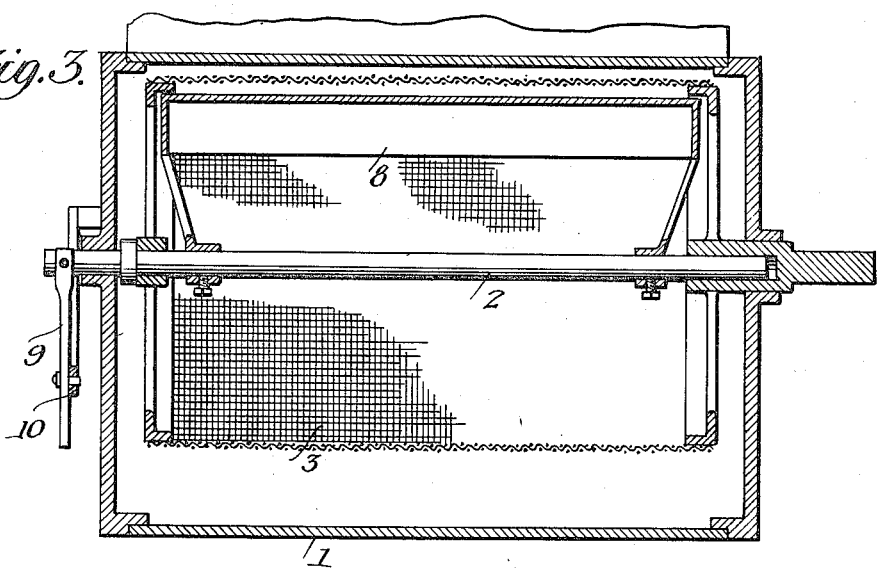
Figure 4:
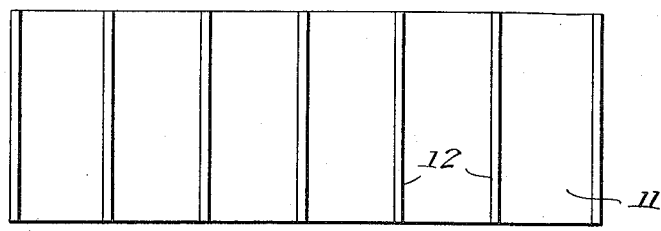
Figure 5:
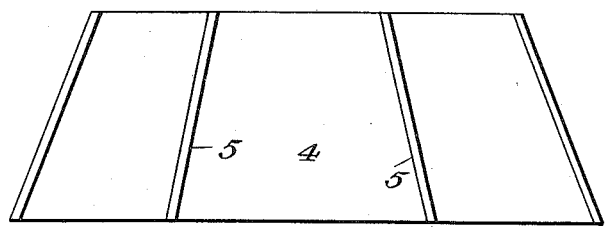
Figure 6:
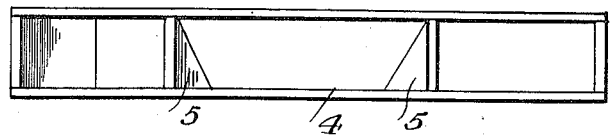

In the accompanying drawings constituting a part of this specification:

Figure 1 is a perspective of a condensing apparatus constructed according to my invention, Fig. 2 is a longitudinally vertical central section of the apparatus, Fig. 3 is a fragmentary transverse section illustrative of the air cut-off means, Fig. 4 is a plan of the spreading board, Fig. 5 is a plan of the discharge trunk of the apparatus, Fig. 6 is an end elevation of the same.

Similar numerals of reference designate corresponding parts in all of the views of the drawings.

My novel condensing apparatus may obviously be made in various sizes, and among other elements it comprises a housing 1 of suitable configuration and suitably supported for the purpose of my invention.

Disposed in the said housing and carried by a transverse shaft 2 is a cylinder 3 the circular wall of which is formed of suitable reticulated material of a mesh compatible with the condensing function. The said cylinder in the operation of the apparatus is rotated in the direction indicated by the arrow in Fig. 2—*i. e.*, in the same direction as the volume of air moves, the scheme of the invention contemplating the deposit of the lint on the screen of cylinder 3 while the air passes as indicated by arrow to the discharge trunk 4 of the apparatus. The said discharge trunk leads to the exhaust fan or fans (not shown), and in the said trunk 4 are disposed partitions 5 which have for their function to assure the suction being the same at the sides and the longitudinal center of the trunk. At this point it will be noted that the scheme of my invention is such that the lint, hair, and other substance to be reduced to bat form is gathered into the bat form without passing through a fan or the like which is one of the main points of advantage peculiar to my novel apparatus. The lint or other substance is picked or taken from the screen wall of the cylinder 3 through the medium of a roller 6, preferably of wood, and which roller is shown in Fig. 2 as contacting with the screen. Manifestly the bat may be of various widths and thicknesses. The roller 6 is of sufficient weight to retain itself under pressure against the cylinder 3, and the said roller is left in the position shown in Fig. 2 until a suitable amount of substance is gathered on the roller whereupon the roller 6 is raised from the locking position shown in Fig. 2 and its place is taken by an auxiliary roller 7 adapted to be used alternately or interchangeably with the roller 6.

At 8 is an air cut-off which has for its function to prevent the suction of air from interfering at the opening where substance is being batted on one of the rollers with the batting operation.

The said cut-off 8 is connected with a hand lever 9 adapted to be adjustably fixed in suitable manner to the segmental rack 10 carried at one end of the cylinder 3 as best shown in Figs. 3 and 4.

At 11 is the throat of the apparatus, designed to be connected with linting machines or analogous machines and having for its function to conduct the lint or other substance to the perimeter of the cylinder 3. On the floor of the said throat 11 and spaced apart in longitudinally inclined position are spreaders 12 which are gradually increased in height as they approach the cylinder 3 and are designed and adapted to distribute or scatter the lint, hair, or other substance evenly to the cylinder 3 through the length of the latter.

This provision manifestly contributes to the deposit of lint or other substance evenly through the area of the cylinder 3.

At 13 is a mold board hinged or otherwise suitably mounted so that it can be raised or lowered to mold the substance that is being condensed in suitable thickness on the cylinder 3.

As clearly illustrated the rollers 6 and 7 are carried by respective swinging arms 14 and 15 and in conjunction with the said arms racks 16 and 17 are provided in which the arms are adapted to rest when their respective rollers are idle.

Incidental to the operation of my novel apparatus the air serves to take dust and dirt from the substance that is being condensed and also serves to carry the same through the discharge trunk 4 to the fan or suction device not shown, from whence the dust and dirt may be discharged into the suitable collector that is also not shown. This latter however is not of my invention, though it is to be noticed that by reason of the dust and dirt being carried out of the apparatus in the manner described the operation of the apparatus is not attended by the dissemination of dust in the atmosphere adjacent to the apparatus which is obviously an important advantage.

It will be gathered from the foregoing that notwithstanding the efficiency of my novel apparatus, its capacity and its adaptability to operate without subjecting attendants to the necessity of breathing dust and lint laden air, the apparatus is extremely simple and inexpensive in construction and is well adapted to withstand the usage to which apparatus of corresponding character is ordinarily subjected.

The mold board 13 is hinged to the housing of the condenser and is equipped with a weight 13ª to counterbalance it so the lint bat can be made any desired thickness.

Having described my invention, what I claim and desire to secure by Letters Patent is:

1. A condensing apparatus comprising a housing having a throat, and spreaders arranged longitudinally in spaced relation on the floor of the throat; said spreaders being inclined upwardly toward the interior of the housing and being increased in height in said direction, a discharge trunk extending longitudinally from the housing at a point opposite to and in a plane below that of the throat; said discharge trunk being tapered as it recedes from the housing and being provided with longitudinally convergent partitions, a cylinder mounted in the housing and disposed between the eduction orifice of the throat and the induction orifice of the discharge trunk, a bat receiving roller adapted to extend through an opening in the housing and bear upon the perimeter of the cylinder, and an air cut-off carried by the cylinder and arranged adjacent to the said opening and the bat roller.

2. A condensing apparatus comprising a housing, a cylinder mounted in said housing and having a circular wall of reticulated material, a throat leading longitudinally to the housing at one side of the cylinder, a discharge trunk extending longitudinally from the housing at a point opposite to the throat and in a plane below that of the throat; the bottom wall of the housing being concave intermediate the throat and the discharge trunk, and said trunk being adapted to be connected with the exhaust means, and a roller adapted to extend through an opening in the upper portion of the housing and bear on the cylinder.

3. In a condensing apparatus, the combination of a housing having a throat at one point and a discharge trunk at an opposite point and also having an opening in its upper portion, a cylinder mounted in the housing and having a circular wall of reticulated material, mold board carried by the housing, an air cut-off carried by the cylinder, and a roller adapted to rest in the opening of the housing and bear on the perimeter of the cylinder.

4. In a condensing apparatus the combination of a housing having an opening in its upper portion, a condensing cylinder arranged in said housing, swinging devices mounted on the housing at opposite sides of said opening, and rollers carried by the swinging devices and adapted to be used alternately in conjunction with the cylinder, each of said swinging devices being arranged when idle to rest out of the way of the other.

5. In a condensing apparatus the combination of a housing, a condensing cylinder therein, and a throat extending upwardly to the interior of the housing; said throat having on its floor longitudinally spaced spreaders gradually increased in height as they approach the interior of the housing.

6. In a condensing apparatus, the combination of a housing, a condensing cylinder arranged in said housing, and a discharge trunk extending from the housing, at right angles to the length of the cylinder, and having longitudinally spaced partitions and also having its induction orifice adjacent to the perimeter of the condensing cylinder.

7. In a condensing apparatus, the combination of a housing having an opening in its upper portion, a condensing cylinder arranged in said housing, brackets carried by the housing and disposed at opposite sides of said opening, stops also disposed at opposite sides of the opening, swinging devices mounted on the brackets at opposite sides of the opening and adapted when idle to rest against said stops, and rollers carried by the swinging devices and adapted to be used alternately in conjunction with the cylinder, each of said swinging devices and its complementary roller being arranged when idle to rest out of the way of the other swinging device and roller.

In testimony whereof I affix my signature.

GEORGE W. MARTIN.